US008685236B2

(12) United States Patent
Miller

(10) Patent No.: US 8,685,236 B2
(45) Date of Patent: Apr. 1, 2014

(54) METHODS AND SYSTEMS FOR TREATING SOUR WATER

(75) Inventor: Gary Daniel Miller, Houston, TX (US)

(73) Assignee: General Electric Company, Schenectady, NY (US)

(*) Notice: Subject to any disclaimer, the term of this patent is extended or adjusted under 35 U.S.C. 154(b) by 797 days.

(21) Appl. No.: 12/544,812

(22) Filed: Aug. 20, 2009

(65) Prior Publication Data
US 2011/0042327 A1 Feb. 24, 2011

(51) Int. Cl.
*C02F 1/72* (2006.01)
*C02F 1/78* (2006.01)
*B01J 19/00* (2006.01)

(52) U.S. Cl.
USPC ...... 210/153; 210/192; 210/188; 210/748.13; 210/749; 210/205; 422/186.12; 422/186.3; 422/187; 96/263; 95/159; 95/161; 423/573.1; 423/242.4

(58) Field of Classification Search
USPC ............ 210/192, 205, 748.01, 748.1, 748.12, 210/748.13, 748.15–748.19, 749, 750, 759, 210/760, 17, 259, 188; 422/21, 22, 24, 422/186.3; 95/149, 232, 181, 172, 161, 95/163, 148, 155, 156, 159, 169, 1; 96/155, 263, 143; 423/224, 242.4, 423/573.1
See application file for complete search history.

(56) References Cited

U.S. PATENT DOCUMENTS

| | | |
|---|---|---|
| 3,718,731 A | 2/1973 | Carlson et al. |
| 3,935,188 A | 1/1976 | Karwat |
| 3,956,460 A | 5/1976 | Brocoff |
| 4,105,545 A | 8/1978 | Muller et al. |
| 4,132,636 A | 1/1979 | Iwase et al. |
| 4,211,646 A | 7/1980 | Westbrook et al. |
| 4,239,620 A | 12/1980 | Doll et al. |
| 4,271,013 A | 6/1981 | Bhattacharyya |
| 4,294,706 A | 10/1981 | Kakihara et al. |
| 4,437,417 A | 3/1984 | Roberts |
| 4,499,060 A | 2/1985 | Ritter et al. |
| 4,508,683 A | 4/1985 | Doll et al. |
| 4,510,057 A | 4/1985 | Rowe et al. |
| 4,522,730 A | 6/1985 | Hochgesand et al. |
| 4,537,682 A | 8/1985 | Wong-Chong |
| 4,620,967 A | 11/1986 | Tippmer |
| 4,737,289 A | 4/1988 | Castaldi et al. |
| 4,790,940 A | 12/1988 | Castaldi et al. |
| 4,802,995 A | 2/1989 | Dvorscek et al. |
| 4,854,942 A | 8/1989 | Denney et al. |
| 5,045,214 A | 9/1991 | Walker |
| 5,160,632 A | 11/1992 | Kleefisch et al. |

(Continued)

OTHER PUBLICATIONS http://www.lloydminsterheavyoil.com/upgradsourwater.htm;
"Upgrader Sour Water Stripping Unit", Website 1997-2008 by Foster Learning Inc.; 2 pages.

(Continued)

*Primary Examiner* — Joseph Drodge
*Assistant Examiner* — Cameron J Allen
(74) *Attorney, Agent, or Firm* — Armstrong Teasdale LLP

(57) ABSTRACT

A method of removing contaminates from sour water is provided. The method includes producing raw sour water within a syngas production system, and removing the contaminates from the raw sour water using a chemical reaction within a treatment unit to produce treated sour water. The treatment unit is in flow communication with the syngas production system.

12 Claims, 6 Drawing Sheets

(56) References Cited

U.S. PATENT DOCUMENTS

| | | |
|---|---|---|
| 5,215,728 A | 6/1993 | McManus |
| 5,236,557 A | 8/1993 | Müller et al. |
| 5,246,598 A | 9/1993 | Proulx et al. |
| 5,415,785 A | 5/1995 | Braden et al. |
| 5,431,877 A | 7/1995 | Brücken et al. |
| 5,433,866 A * | 7/1995 | Hoppe et al. ............. 210/748.11 |
| 5,552,063 A | 9/1996 | Yan |
| 5,635,078 A | 6/1997 | Yan |
| 5,858,206 A | 1/1999 | Castillo |
| 5,948,378 A | 9/1999 | Koveal et al. |
| 6,107,353 A | 8/2000 | Koveal et al. |
| 6,238,574 B1 | 5/2001 | Cesa et al. |
| 6,296,739 B1 | 10/2001 | Godbole |
| 6,793,776 B2 | 9/2004 | Godbole |
| 7,253,332 B2 | 8/2007 | Kojima et al. |
| 7,326,340 B2 * | 2/2008 | Harshman et al. ......... 210/198.1 |
| 2002/0192132 A1 * | 12/2002 | Carlson et al. ................ 422/198 |
| 2003/0062305 A1 * | 4/2003 | Khudenko .................... 210/603 |
| 2004/0045908 A1 * | 3/2004 | Vuong et al. .................. 210/748 |
| 2009/0188867 A1 * | 7/2009 | Vuong et al. .................. 210/652 |

OTHER PUBLICATIONS http://www.castion.com/IndustrialSolutions/SOUR-WATER.aspx; "Sour Water", Copyright 2008, Castion Corporation, 2 pages.

http://oilandgas.veoliawater.com/en/expertise/our_understanding/introduction/, "Hydrocarbon Processing Industry", Veolia water; 2 pages.

Armstrong et al., "Sour Water Stripping", Today's Refinery, Jun. 1996, 5 pages.

http://www3.interscience.wiley.com/journal/112735850/abstract?; Urban et al., Abstract, "Compliance strategy for cyanides in petroleum refinery wastewater: Part 1—Source characterization and treatment", Environmental Progress, vol. 16 (3), Copyright 2008, AIChE, 2 pages.

* cited by examiner

METHODS AND SYSTEMS FOR TREATING SOUR WATER

BACKGROUND OF THE INVENTION

The embodiments described herein relate generally to methods and system for treating sour water and, more particularly, to methods and system for use in removing contaminates from sour water.

At least some known systems, such as gasification systems, produce sour water. As used herein, the term "sour water" refers to water that includes cyanide, hydrocarbons, hydrogen sulfide, ammonia, phenol, selenium, salts, organics, and/or other chemicals. Further, as used herein, the term "cyanide" refers to any chemical compound that includes a carbon atom bonded to a nitrogen atom (CN), such as simple cyanides and/or cyano complexes, the term "ammonia" refers to any chemical compound that includes $NH_3$ and/or $NH_4OH$, and the term "organics" refers to any chemical compound that includes carbon (C). Further, as used herein, the term "contaminates" refers to cyanide, ammonia, and/or organics.

In at least one known gasification system, a low temperature gas cooling section produces sour water in the form of recovered process condensate. A condensate ammonia stripper removes ammonia, hydrogen sulfide ($H_2S$) and/or other trace components from the recovered process condensate to produce stripped sour water. Cyanide from the stripped sour water may become concentrated in an overhead reflux stream within a column downstream from the condensate ammonia stripper. In such a system, a small blowdown stream, i.e., approximately 1-10 gallons per minute (gpm), of sour water is routed from the reflux stream to a recycle solids tank for use in preventing cyanide from concentrating in the column and/or overhead piping. Without the blowdown stream, high metallurgy materials may be required in a reflux pump suction, a reflux pump, an overhead condenser, and/or condenser return piping to the overhead condenser. When routed to the recycled solids tank and/or pumped to a grinding mill, cyanide from the blowdown stream can potentially create exposure hazards.

As such, it is desirable to remove contaminates from sour water before the sour water is channeled to a recycle solids tank and/or a grinding mill. More particularly, it is desirable to remove contaminates from sour water streams produced in an ammonia stripping system of a gasification system.

BRIEF DESCRIPTION OF THE INVENTION

In one aspect, a method of removing contaminates from sour water is provided. The method includes producing raw sour water within a syngas production system, and removing the contaminates from the raw sour water via a chemical reaction within a treatment unit to produce treated sour water. The treatment unit is coupled in flow communication with the syngas production system.

In another aspect, a sour water treating system is provided. The sour water treating system includes a condensate stripper configured to produce raw sour water and a condensate stripper cooler coupled in flow communication with the condensate stripper. The condensate stripper cooler is configured to receive the raw sour water from the condensate stripper. The system further includes an outlet line configured to channel the raw sour water from the condensate stripper cooler and a treatment unit coupled in flow communication between the condensate stripper cooler and the liquid outlet line. The treatment unit is configured to substantially remove contaminates from the raw sour water via a chemical reaction.

In yet another aspect, a syngas generation system is provided. The syngas generation system includes a gasifier configured to produce syngas and at least one by-product, a condensate stripper configured to produce raw sour water from the at least one by-product, and a condensate stripper cooler coupled in flow communication with the condensate stripper. The condensate stripper cooler configured to receive the raw sour water from the condensate stripper. The syngas generation system further includes a liquid outlet line configured to channel the raw sour water from the condensate stripper cooler, and a treatment unit coupled in flow communication between the condensate stripper cooler and the liquid outlet line. The treatment unit is configured to substantially remove contaminates from the raw sour water via a chemical reaction.

By including a treatment unit configured to remove contaminates from sour water produced by a condensate ammonia stripper, the embodiments herein facilitate removing contaminates from the sour water before the sour water is further processed in, for example, a recycled solids tank and/or a grinding mill. As such, the methods and systems described herein facilitate reducing potential hazard from contaminates exposure.

BRIEF DESCRIPTION OF THE DRAWINGS

FIG. 1 is a schematic illustration of an exemplary syngas generation system.

FIG. 2 is a schematic view of an exemplary condensate stripper that may be used with the syngas generation system shown in FIG. 1.

FIG. 3 is a schematic view of an exemplary condensate stripper cooler that may be used with the syngas generation system shown in FIG. 1.

FIG. 4 is a schematic illustration of an exemplary treatment unit that may be used with the gasification for syngas generation system shown in FIG. 1.

FIG. 5 is a schematic illustration of an alternative exemplary treatment unit that may be used with the gasification for syngas generation system shown in FIG. 1.

FIG. 6 is a schematic illustration of another alternative exemplary treatment unit that may be used with the gasification for syngas generation system shown in FIG. 1.

DETAILED DESCRIPTION OF THE INVENTION

The exemplary embodiments described herein provide methods and systems for removing contaminates from a sour water stream within a gasification system. In one embodiment, ozone is used to oxidize cyanide and/or other contaminates into safe oxidation by-products. In an alternative embodiment, ultraviolet light is used to react cyanide and/or other contaminates into safe by-products. In another alternative embodiment, hydrogen peroxide is used to oxidize cyanide and/or other contaminates into safe oxidation by-products. As such, the embodiments described herein facilitate preventing contaminates from accumulating in a condensate ammonia stripper and/or removing contaminates from a recycle solids tank and/or grinding area.

Figure 1:
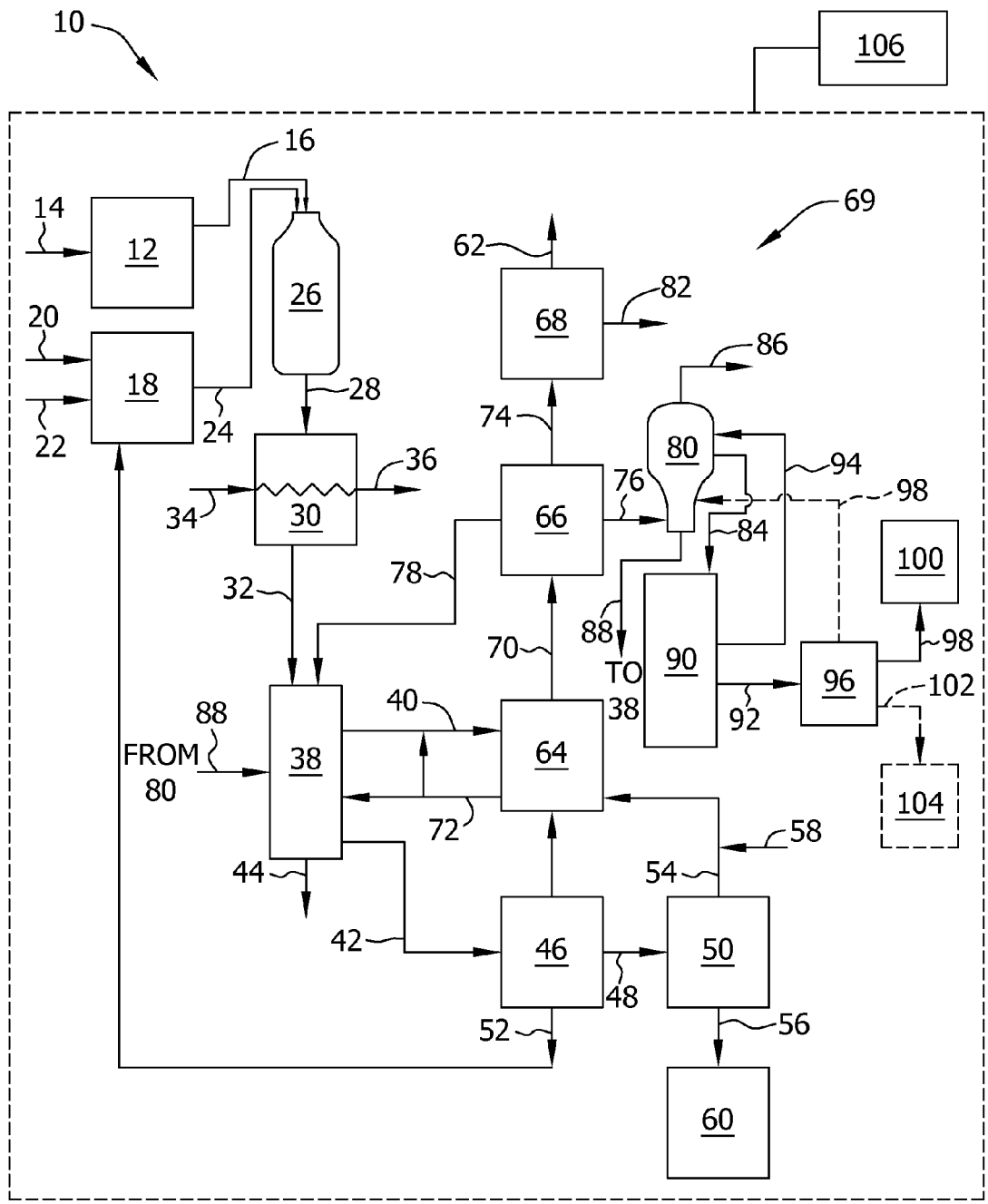
FIGS. 1-6 show exemplary embodiments of the systems and methods described herein.
Figure 2:
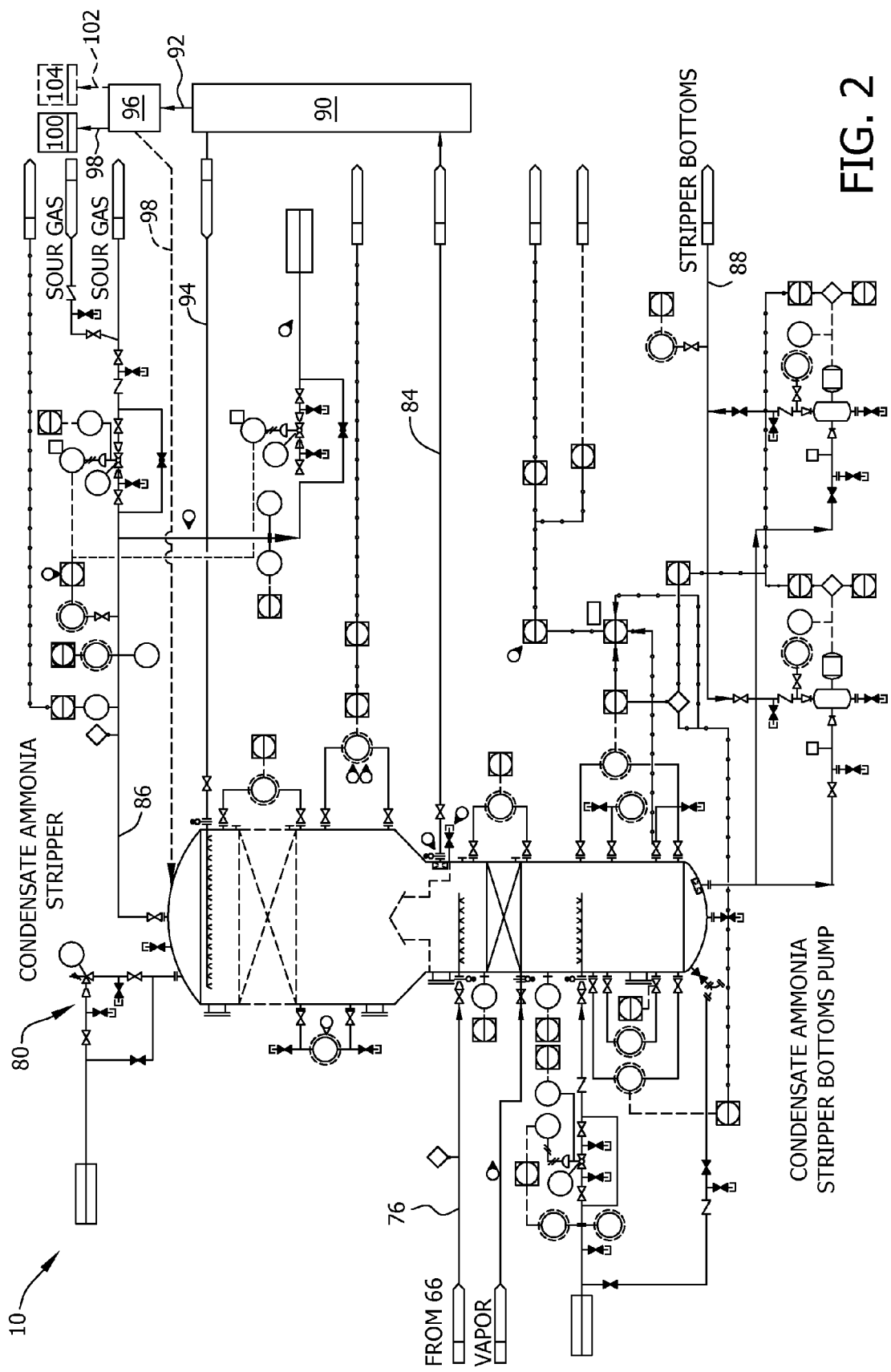
Figure 3:
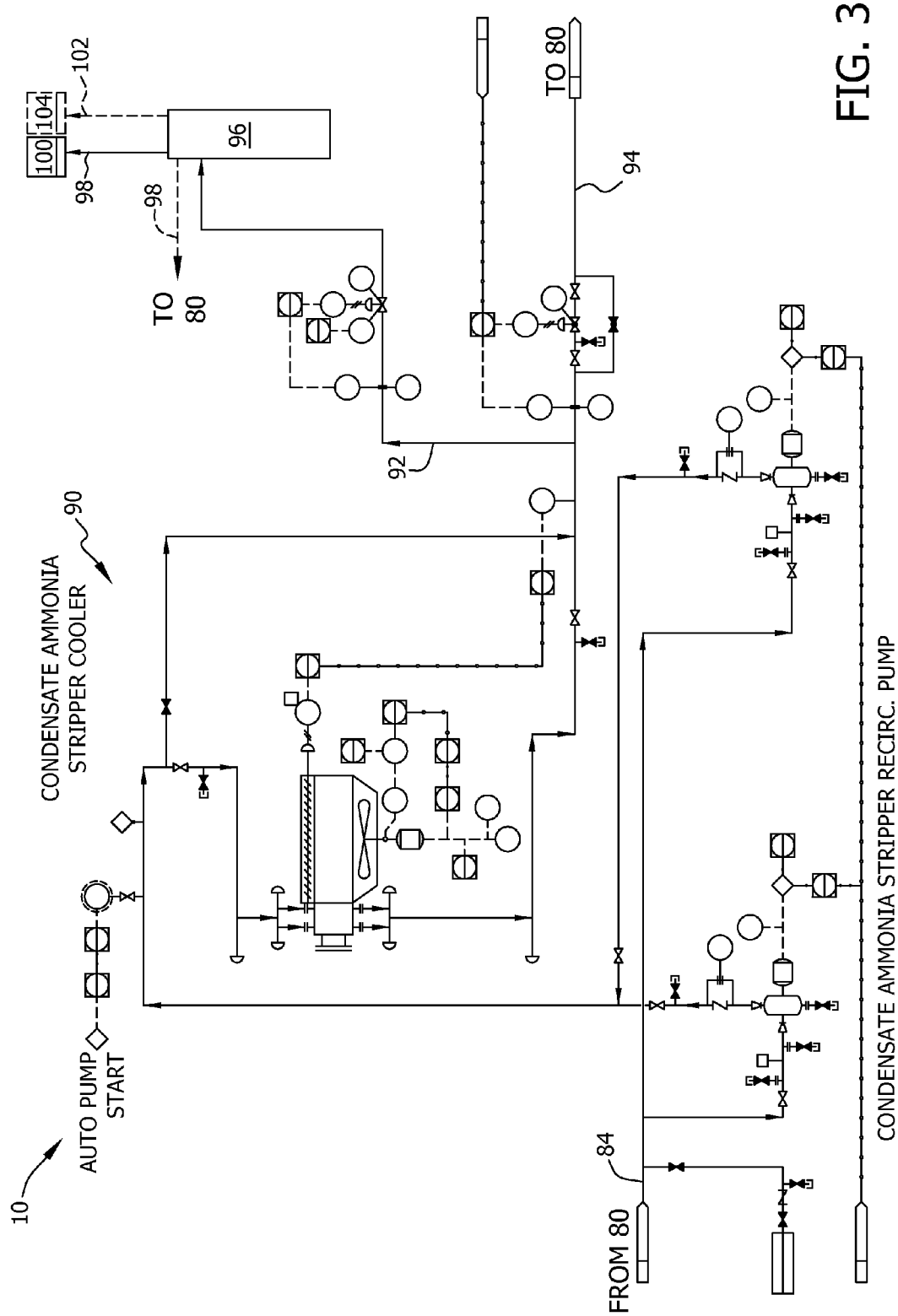

FIG. 1 is a schematic diagram of an exemplary gasification for syngas generation system 10. FIG. 2 is a schematic view of an exemplary condensate stripper 70 that may be used with syngas generation system 10. FIG. 3 is a schematic view of an exemplary condensate stripper cooler 90 that may be used with syngas generation system 10.

In the exemplary embodiment, syngas generation system 10 includes an air separation unit (ASU) 12 for use in separating air 14 to produce gasifier oxygen 16 and a carbonaceous fuel preparation unit 18 for preparing carbonaceous fuel 20 and water 22 to produce gasifier fuel 24. ASU 12 and fuel preparation unit 18 are coupled in flow communication to a gasifier 26 that produces a gas/solids mixture 28 by a partial oxidation process of gasifier oxygen 16 and fuel 24. Mixture 28 includes the main product synthetic gas ("syngas") and at least one by-product, which may include slag and unburned carbon, condensate, solids, liquids, and/or gases. Gasifier 26 is coupled in flow communication to a syngas cooler 30 that facilitates cooling mixture 28 to a cooled gas/solids mixture 32. Boiler feed water 34 is fed into syngas cooler 30 to produce steam 36 for use in downstream units. Syngas cooler 30 is coupled in flow communication to a gas/liquid/solids separation apparatus 38 wherein the cooled gas/solids mixture 32 is separated into raw syngas 40 (gas), black water 42 (liquid), and slag 44 (solids). Slag 44 is a by-product that may be reused and/or disposed of off-site.

Black water 42 from gas/liquid/solids separation apparatus 38 is channeled to a black water handling unit 46. Black water handling unit 46 separates black water 42 into grey water 48 for processing in grey water handling unit 50 and a stream 52 having a high concentration of suspended solids, wherein the stream 52 can be reused in fuel preparation unit 18. Grey water handling unit 50 processes grey water 48 to produce a relatively lower suspended solids grey water 54 for use in a syngas scrubber 64 and a relatively higher suspended solids grey water 56 as wastewater. Grey water 54, which has less suspended solids as compared to black water 42 or grey water 48 and/or 56, may be combined with makeup water 58, if needed, and, in the exemplary embodiment, is used in syngas scrubber 64 as a scrubbing water for the raw syngas 40. A portion of grey water 48 is discharged as wastewater or grey water blowdown 56 to a wastewater processing system 60 to facilitate reducing contaminant buildup that may adversely affect syngas generation system 10.

Raw syngas 40 is converted to clean syngas 62 by processing raw syngas 40 serial through a syngas scrubber 64, a syngas cooling system 66, and an acid gas removal system 68. More specifically, syngas scrubber 64 scrubs particulates from raw syngas 40 to produce scrubbed syngas 70 and produces water 72 for use in gas/liquid/solids separation apparatus 38. Syngas cooling system 66 facilitates cooling the scrubbed syngas 70 to produce low temperature syngas 74 that is channeled to acid gas removal system 68 and to produce condensate 76 and 78 for use in processing within a condensate stripper 80 and gas/liquid/solids separation apparatus 38, respectively. Condensate 76, in the exemplary embodiment, is raw sour water. Acid gas removal system 68 removes acid gas 82 from low temperature syngas 74 to produce clean syngas 62. Acid gas 82 is a by-product that may be processed and/or disposed of in downstream units. Clean syngas 62 is the main product of syngas generation system 10 and can be used for power production, chemical production, and/or other usage. Gasifier 26, syngas cooler 30, separation apparatus 38, a syngas scrubber 64, a syngas cooling system 66, and an acid gas removal system 68 are also referred to herein as a syngas production system 69. As such, syngas production system 69 produces at least syngas 62 and sour water 76.

In the exemplary embodiment, condensate stripper 80 strips ammonia from sour water 76 to produce stripped condensate or stripped sour water 84, a by-product ammonia gas or sour gas 86, and stripper bottoms 88. Sour gas 86 may be processed and/or disposed of in downstream units. Stripper bottoms 88 is routed to separation apparatus 38 for further processing. Stripped sour water 84 is routed from condensate stripper 80 to a condensate stripper cooler 90 for cooling thereof. Condensate stripper cooler 90 cools stripped sour water 84 and separates stripped sour water 84 into stripped sour water 92 and a recirculation stream 94. Sour water 92 that is discharged from condensate stripper cooler 90 is chemically similarly to sour water 84 channeled into condensate stripper cooler 90 but has a lower temperature than sour water 84. As such, sour water 92 is also referred to as cooler sour water.

Recirculation stream 94 is condensed vapor in a liquid state that is used as water in syngas generation system 10 and/or exits through an overhead condenser. Stripped sour water 92 is channeled to a treatment unit 96 to facilitate removal of compounds, such as contaminates, from stripped sour water 92, as described in more detail below. In the exemplary embodiment, treatment unit 96 is considered to be part of a condensate ammonia stripper overhead reflux loop. Treated sour water 98 is discharged from treatment unit 96 to any suitable location, such as a recycled solids tank 100. Additionally, or alternatively, treated sour water 98 is discharged to syngas scrubber 64. Any gases 102 produced during treatment of stripped sour water 92 within treatment unit 96 are discharged to any suitable location, such as a vent treatment unit 104. Vent treatment unit 104 is, for example, a sulfur recovery unit, a sulfuric acid plant, a thermal oxidizer, and/or any other suitable type of treatment device. In the exemplary embodiment, condensate stripper 80, condensate stripper cooler 90, and treatment unit 96 form a stripping and treating system within syngas generation system 10.

A control system 106 is coupled in operational control communication with syngas generation system 10 to control the components therein to form syngas 62. As used herein, the term "operational control communication" refers to a link, such as a conductor, a wire, and/or a data link, between two or more components of syngas generation system 10 that enables signals, electric currents, and/or commands to be communicated between the two or more components. The link is configured to enable one component to control an operation of another component of syngas generation system 10 using the communicated signals, electric currents, and/or commands.

Figure 4:
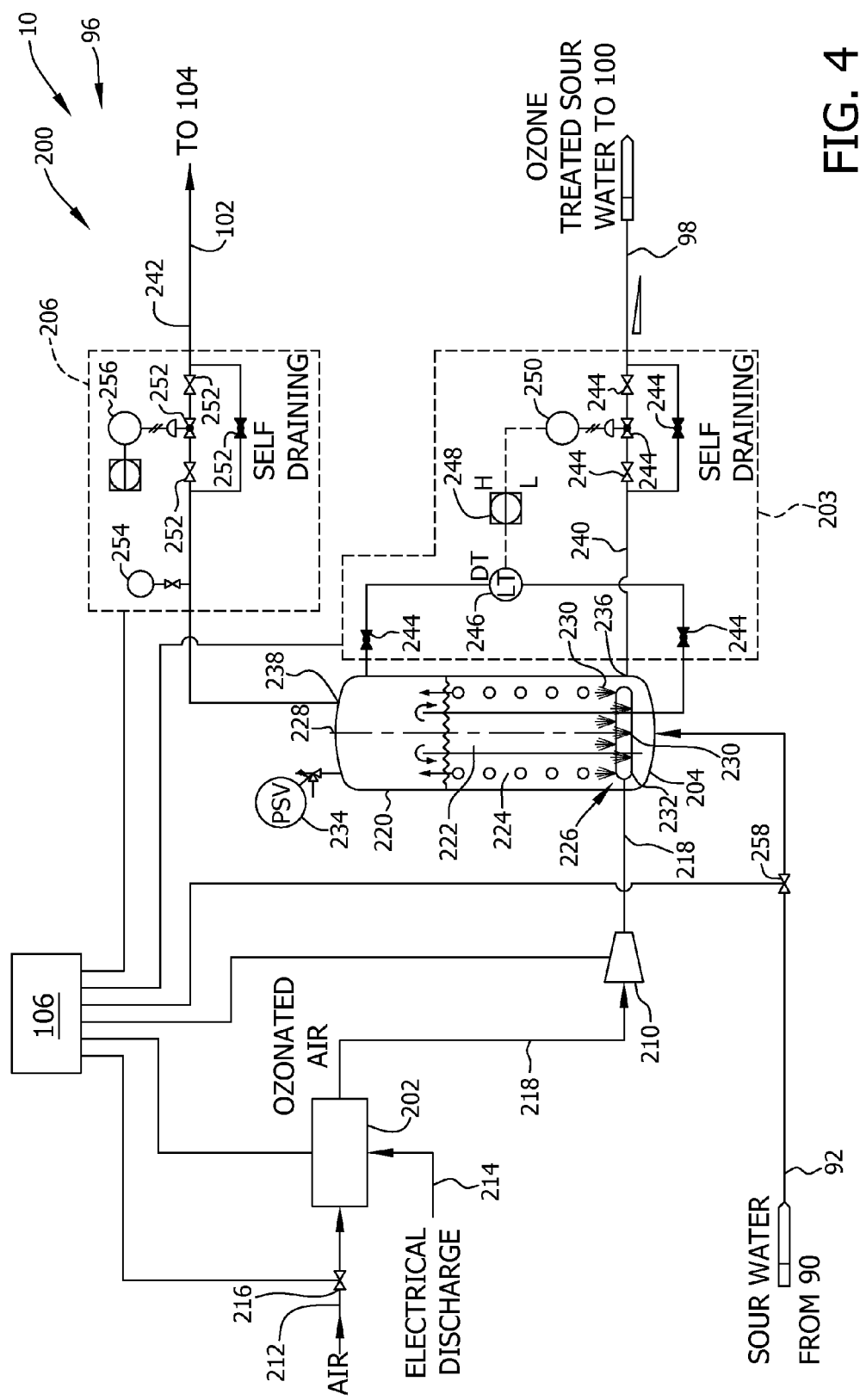

FIG. 4 is a schematic illustration of an exemplary treatment unit 200 that may be used with syngas generation system 10 (shown in FIG. 1) as treatment unit 96 (shown in FIGS. 1-3). Treatment unit 200 includes an ozone generator 202, an ozone contactor 204, a backpressure control circuit 206, and a bypass circuit 208. Ozone generator 202 is coupled in flow communication with ozone contactor 204 via a pump 210. Although a pump is described herein, it should be understood that pump 210 can be a compressor, a blower, and/or any other suitable flow control device. In the exemplary embodiment, backpressure control circuit 206 is coupled in flow communication between ozone contactor 204 and vent treatment unit 104. Bypass circuit 208 is coupled in flow communication between ozone contactor 204 and recycled solids tank 100 and/or condensate stripper 80. In the exemplary embodiment, ozone contactor 204 acts as a flash drum.

In the exemplary embodiment, air 212 and an electrical discharge 214 are supplied to ozone generator 202. Air 212 can be supplied to ozone generator 202 from the atmosphere, from within syngas generation system 10, and/or from any suitable source. The flow of air 212 is controlled using a valve 216, such as a hand valve. Within ozone generator 202, electrical discharge 214 at least partially electrically breaks down air 212 to generate ozonated air 218. As such, electrical discharge 214 is of a sufficient voltage to ionize air 212 to produce ozonated air 218 from air 212. Alternatively, ozonated air 218 is generated within ozone generator 202 from the electrolysis of water. In the exemplary embodiment, ozonated air 218 is drawn from ozone generator 202 by pump 210.

Ozone contactor 204 includes, in the exemplary embodiment, a shell 220 that encloses a sour water inlet tube 222, a reaction chamber 224, and an ozonated air injector 226. Sour water inlet tube 222 is coupled in flow communication with condensate stripper cooler 90 and, in the exemplary embodiment, extends along a longitudinal axis 228 of ozone contactor 204. Reaction chamber 224 is defined between sour water inlet tube 222 and shell 220. Ozonated air injector 226 is positioned within reaction chamber 224 and includes at least one injector nozzle 230. In the exemplary embodiment, ozonated air injector 226 includes an annular manifold 232 that is coupled in flow communication with ozone generator 202 via pump 210. Annular manifold 232 extends through reaction chamber 224 about sour water inlet tube 222 and includes a plurality of injector nozzles 230. Alternatively, ozonated air 218 and stripped sour water 92 can be introduced and/or reacted within ozone contactor 204 by any suitable technique and/or method that enables treatment unit 200 to function as described herein. In the exemplary embodiment, ozone contactor 204 has a residence time that is sufficient to oxidize containments present in stripped sour water 92.

In the exemplary embodiment, ozone contactor 204 includes a safety valve 234, a liquid outlet 236, and a gas outlet 238. Safety valve 234 senses at least a pressure within ozone contactor 204 and relieves the pressure if the operating pressure exceeds a predetermined threshold. Liquid outlet 236 is coupled in flow communication with a liquid outlet line 240, and gas outlet 238 is coupled in flow communication with a gas outlet line 242. Liquid outlet line 240 is coupled in flow communication with recycled solids tank 100 and/or condensate stripper 80 to enable gravity draining from ozone contactor 204 to recycled solids tank 100 and/or condensate stripper 80. Gas outlet line 242 is coupled in flow communication with vent treatment unit 104.

Bypass circuit 208 is positioned along liquid outlet line 240 and includes, in the exemplary embodiment, a plurality of valves 244, a level transmitter 246, a high/low alarm 248, and a level controller 250. More specifically, at least one valve 244 is coupled to liquid outlet line 240. Level controller 250 is in operational control communication with at least one valve 244, and is electrically coupled to level transmitter 246 and high/low alarm 248 for receiving data from level transmitter 246 and/or high/low alarm 248. Alternatively, bypass circuit 208 may have any suitable configuration that enables components of treatment unit 200 to be controlled for performing maintenance, level control operations, and/or other operations of treatment unit 200. In the exemplary embodiment, level transmitter 246 senses a level of sour water 92 within ozone contactor 204, and high/low alarm 248 determines whether the sensed level satisfies predetermined conditions. If, for example, the sensed level is above a predetermined threshold, bypass circuit 208 reduces a level within ozone contactor to satisfy the predetermined conditions. In the exemplary embodiment, bypass circuit 208 is self-draining.

Backpressure control circuit 206 is positioned along gas outlet line 242 and includes a plurality of valves 252, a pressure transmitter 254, and a pressure controller 256. More specifically, at least one valve 252 is coupled to gas outlet line 242. Pressure controller 256 is in operational control communication with at least one valve 252, and is electrically coupled to pressure transmitter 254 to receive data from pressure transmitter 254. Alternatively, backpressure control circuit 206 has any suitable configuration that enables components of treatment unit 200 for performing pressure control operations and/or other operations of treatment unit 200. In the exemplary embodiment, pressure transmitter 254 senses a pressure within gas outlet line 242 and transmits the sensed pressure to pressure controller 256. Pressure controller 256 controls at least one valve 252 to control the pressure within gas outlet line 242. In the exemplary embodiment, backpressure control circuit 206 is self-draining.

Control system 106 is in operational control communication with at least an inlet valve 258, ozone generator 202, pump 210, valve 216, bypass circuit 208, and backpressure control circuit 206 for controlling components of treatment unit 200 to function as described herein. During a treatment operation, stripped sour water 92 enters ozone contactor 204 from ammonia stripper 90 when inlet valve 258 is opened. Further, ozonated air 218 is produced from air 212 and electrical discharge 214 is produced from ozone generator 202 when valve 216 is opened. Pump 210 channels ozonated air 218 from ozone generator 202 to ozone contactor 204. More specifically, control system 106 controls an amount of ozonated air 218 and an amount of stripped sour water 92 entering ozone contactor 204 based on reaction criteria, such as a predetermined stoichiometric ratio within ozone contactor 204. For example, a super-stoichiometric amount of air 212 is routed to ozone generator 102 to produce ozonated air 218.

Stripped sour water 92 enters ozone contactor 204 through inlet tube 222 and flows into reaction chamber 224. Ozonated air 218 is discharged into reaction chamber 224 of ozone contactor 204 through at least one nozzle 230. In the exemplary embodiment, when ozonated air 218 contacts stripped sour water 92, a resulting chemical reaction substantially removes contaminates from stripped sour water 92 to produce treated sour water 98. In one embodiment, ozonated air 218 is channeled to ozone contactor 204 and saturates stripped sour water 92 with super-stoichiometric amounts of ozone to oxidize stripped sour water 92. In the exemplary embodiment, ozone contactor 204 is designed with sufficient residence time to ensure substantially all of the contaminates within stripped sour water 92 is reacted with the ozone to produce treated sour water 98.

Waste gas 102 is channeled from ozone contactor 204 through gas outlet line 242 to vent treatment unit 104 for further processing. Backpressure control circuit 206 controls a pressure of gas 102 within gas outlet line 242. Treated sour water 98 is channeled from ozone contactor 204 through liquid outlet line 240 to recycled solids tank 100. Alternatively or additionally, treated sour water 98 is channeled from ozone contactor 204 to condensate stripper 80, which facilitates preventing contaminates from accumulating in condensate stripper 80 and/or removing contaminates from recycled solids tank 100 and/or a grinding area. In the exemplary embodiment, bypass circuit 208 controls a flow of treated sour water 98 through liquid outlet line 240.

Figure 5:
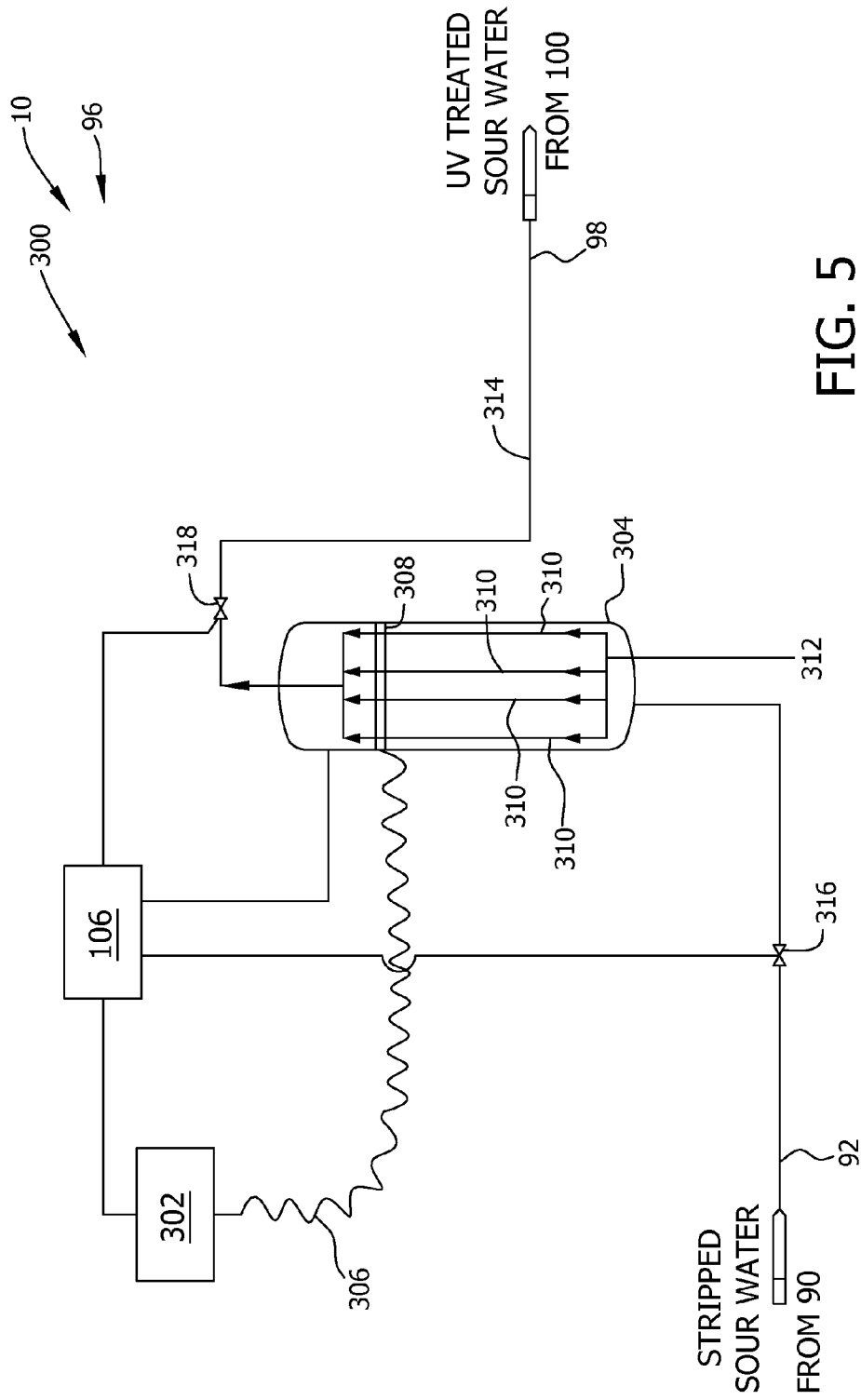

FIG. 5 is a schematic illustration of an exemplary treatment unit 300 that may be used with syngas generation system 10 (shown in FIG. 1) as treatment unit 96 (shown in FIGS. 1-3). In the exemplary embodiment, treatment unit 300 includes an ultraviolet (UV) light generator 302 and a UV contactor 304. UV light generator 302 produces UV light 306.

In the exemplary embodiment, UV contactor 304 includes at least one UV light tube 308 and at least one sour water tube 310 that is proximate to UV light tube 308. UV light generator 302 is optically coupled to UV light tube 308 for transmitting UV light 306 through UV light tube 308. As such, in the exemplary embodiment, UV light tube 308 is formed at least partially from a transparent material that does not react with UV light 306. It should be understood that UV contactor 304 may have any suitable number and/or configuration for UV light tubes 308. In the exemplary embodiment, UV contactor 304 includes an array of sour water tubes 310 that are in flow communication with an inlet manifold 312. Inlet manifold 312 is in flow communication with stripper cooler 90. Although FIG. 5 illustrates that sour water tubes 310 are vertically oriented, it should be understood that sour water tubes 310 may have any suitable orientation and/or configuration that enables treatment unit 300 to function as described herein. In the exemplary embodiment, sour water tube 310 is in flow communication with a liquid outlet line 314 that is in flow communication with recycled solids tank 100 and/or condensate stripper 80. Treatment unit 300 also includes at least an inlet valve 316 and an outlet valve 318 for use in controlling a flow of stripped sour water 92 through UV contactor 304.

Control system 106 is in operational control communication with at least valve 316, UV light generator 302, UV contactor 304, and valve 318 for controlling components of treatment unit 300 to function as described herein. During a treatment operation, stripped sour water 92 enters UV contactor 304 from stripper cooler 90 when valve 316 is opened. More specifically, stripped sour water 92 is discharged from stripper cooler 90 into at least one sour water tube 310. Further, UV light generator 302 generates UV light 306 and transmits UV light 306 to UV contactor 304. More specifically, UV light 306 is transmitted through at least one UV light tube 308. When stripped sour water 92 flows through sour water tubes 310, stripped sour water 92 flows past UV light tube 308. As stripped sour water 92 flows past UV light tube 308, UV light 306 causes contaminates within stripped sour water 92 to react such that contaminates is substantially removed from stripped sour water 92 to produce treated sour water 98. Treated sour water 98 is then channeled through liquid outlet line 314 to recycled solids tank 100. Alternatively or additionally, treated sour water 98 is channeled through liquid outlet line 314 to condensate stripper 80.

Figure 6:
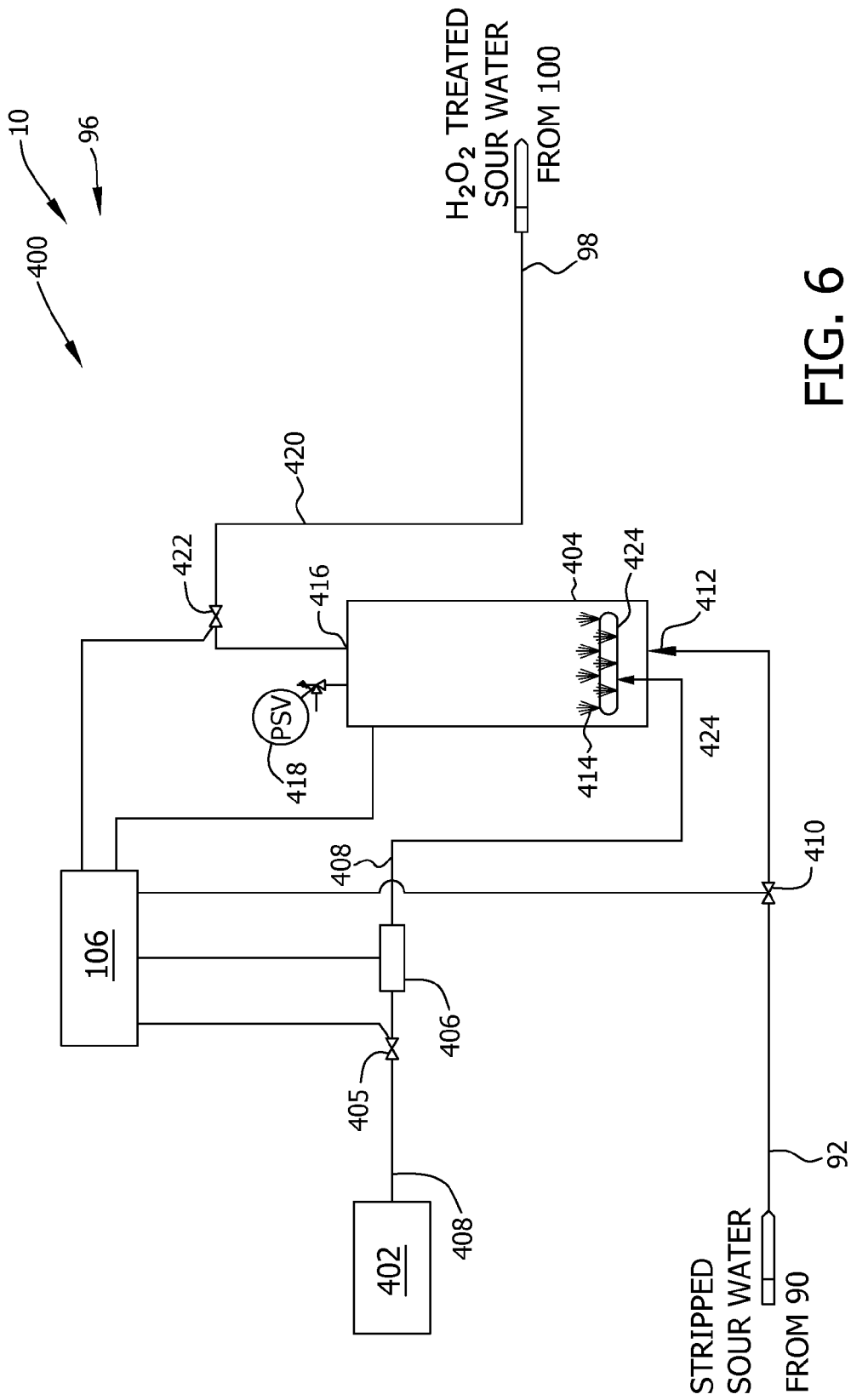

FIG. 6 is a schematic illustration of an exemplary treatment unit 400 that may be used with syngas generation system 10 (shown in FIG. 1) as treatment unit 96 (shown in FIGS. 1-3). Treatment unit 400 includes a hydrogen peroxide ($H_2O_2$) storage tank 402 and a hydrogen peroxide contactor 404. In an alternative embodiment, treatment unit 400 includes an inline mixer (not shown) rather than hydrogen peroxide contactor 404. Hydrogen peroxide contactor 404 and the inline mixer are generally referred to as a reaction chamber. In the exemplary embodiment, hydrogen peroxide storage tank 402 is coupled in flow communication with hydrogen peroxide contactor 404 via a metering valve 405 and a metering pump 406. Metering valve 405 and/or metering pump 406 controls an amount of hydrogen peroxide 408 supplied from hydrogen peroxide storage tank 402 to hydrogen peroxide contactor 404. Further, hydrogen peroxide contactor 404 is coupled in flow communication with stripper cooler 90 via an inlet valve 410.

Hydrogen peroxide contactor 404 includes, in the exemplary embodiment, a sour water inlet 412, at least one nozzle 414, a treated sour water outlet 416, and a safety valve 418. Sour water inlet 412 is coupled in flow communication with stripper cooler 90, and treated sour water outlet 416 is coupled in flow communication with a liquid outlet line 420. Nozzle 414 is coupled in flow communication with hydrogen peroxide storage tank 402. Safety valve 418 controls at least a pressure within hydrogen peroxide contactor 404, and an outlet valve 422 is coupled to liquid outlet line 420 to control a flow of treated sour water 98 through liquid outlet line 420. In the exemplary embodiment, hydrogen peroxide contactor includes a plurality of nozzles 414 that are coupled in flow communication with a manifold 424 that is in flow communication with hydrogen peroxide storage tank 402.

Control system 106 is in operational control communication with at least inlet valve 410, metering valve 405, metering pump 406, hydrogen peroxide contactor 404, and outlet valve 422 for controlling components of treatment unit 400 to function as described herein. During a treatment operation, stripped sour water 92 enters hydrogen peroxide contactor 404 from stripper cooler 90 when valve 410 is opened. Moreover, metering valve 405 and/or metering pump 406 draws a predetermined amount of hydrogen peroxide 408 from hydrogen peroxide storage tank 402 for discharge into hydrogen peroxide contactor 404. In one embodiment, metering valve 405 and/or metering pump 406 controls an amount of hydrogen peroxide 408 entering hydrogen peroxide contactor 404 to generate a substantially ideal stoichiometric amount or an overfed stoichiometric amount of hydrogen peroxide 408 within hydrogen peroxide contactor 404. For example, in one embodiment, metering valve 405 and/or metering pump 406 produces a stoichiometric ration (SR) of between about 1.0 and about 1.5 within hydrogen peroxide contactor 404.

In the exemplary embodiment, metering valve 405 and/or metering pump 406 channels hydrogen peroxide 408 to manifold 424 for discharge into hydrogen peroxide contactor 404 through nozzles 414. When hydrogen peroxide 408 contacts stripped sour water 92, hydrogen peroxide 408 and stripped sour water 92 react to substantially remove contaminates from stripped sour water 92 to produce treated sour water 98. In the exemplary embodiment, hydrogen peroxide contactor 404 is designed with sufficient residence time to perform a chemical reaction of the contaminates within stripped sour water 92 to produce treated sour water 98. Treated sour water 98 is channeled through liquid outlet line 420 to recycled solids tank 100. Alternatively or additionally, treated sour water 98 is channeled through liquid outlet line 420 to condensate stripper 80.

The embodiments described herein provide methods and systems for removing contaminates from sour water before the sour water is channeled to a storage tank and/or further processing units. As such, the above-described embodiments facilitate reducing a possibility of contaminates and/or other potentially volatile materials, such as ammonia, cyanide, and/or organics, from being undesirably routed to a recycled solids tank, which may lead to exposure to contaminates. Further, the systems described herein facilitate reducing accumulation of contaminates in a condensate ammonia stripper, which facilitates reducing the need for more expensive materials to be used in the condensate ammonia stripper systems, as compared to ammonia stripper systems having contaminates therein.

Exemplary embodiments of methods and systems for treating sour water are described above in detail. The methods and systems are not limited to the specific embodiments described herein, but rather, components of systems and/or steps of the methods may be utilized independently and separately from other components and/or steps described herein. For example, the methods may also be used in combination with other sour water producing systems and methods, and are not limited to practice with only the gasification systems and methods as described herein. Rather, the exemplary embodiment can be implemented and utilized in connection with many other contaminates removal applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sour water treating system comprising:
   a condensate stripper configured to produce liquid raw sour water and sour gas;
   a sour gas line coupled to said condensate stripper and configured to channel the sour gas from said condensate stripper;
   a condensate stripper cooler coupled in flow communication with said condensate stripper, said condensate stripper cooler configured to receive the raw sour water from said condensate stripper;
   an outlet line configured to channel the raw sour water from said condensate stripper cooler; and
   a treatment unit coupled in flow communication between said condensate stripper cooler and said outlet line, said treatment unit configured to substantially remove contaminates from the raw sour water via a chemical reaction before the sour water and at least one by-product are discharged to at least one of a recycled solids tank, a grinding mill, a syngas scrubber, and a vent treatment unit.

2. A sour water treating system in accordance with claim 1 wherein said outlet line channels the raw sour water from said condensate stripper cooler to at least one of a storage tank and a syngas scrubber.

3. A sour water treating system in accordance with claim 1 wherein said treatment unit comprises an ozone contactor configured to react the raw sour water and ozonated air to substantially remove the contaminates from the raw sour water.

4. A sour water treating system in accordance with claim 3 wherein said treatment unit further comprises an ozone generator configured to produce the ozonated air from air.

5. A sour water treating system in accordance with claim 1 wherein said treatment unit comprises an ultraviolet (UV) contactor configured to react the raw sour water with UV light to substantially remove the contaminates from the raw sour water.

6. A sour water treating system in accordance with claim 5 wherein said treatment unit further comprises a UV light generator configured to generate the UV light, said UV contactor comprises:
   at least UV light tube optically coupled to said UV light generator such that the UV light is transmitted through said at least one UV light tube; and
   at least one sour water tube coupled proximate to said at least one UV light tube such that the raw sour water and the UV light react to substantially remove the contaminates from the raw sour water.

7. A sour water treating system in accordance with claim 1 wherein said treatment unit comprises a hydrogen peroxide contactor configured to react the raw sour water with hydrogen peroxide to substantially remove the contaminates from the raw sour water.

8. A sour water treating system in accordance with claim 7 wherein said treatment unit further comprises a metering pump configured to meter a predetermined amount of the hydrogen peroxide to said hydrogen peroxide contactor.

9. A syngas generation system comprising:
   a gasifier configured to produce syngas and at least one by-product;
   a condensate stripper configured to produce liquid raw sour water and sour gas from the at least one by-product;
   a sour gas line coupled to said condensate stripper and configured to channel the sour gas from said condensate stripper;
   a condensate stripper cooler coupled in flow communication with said condensate stripper, said condensate stripper cooler configured to receive the raw sour water from said condensate stripper;
   a liquid outlet line configured to channel the raw sour water from said condensate stripper cooler; and
   a treatment unit coupled in flow communication between said condensate stripper cooler and said liquid outlet line, said treatment unit configured to substantially remove contaminates from the raw sour water via a chemical reaction before the sour water and at least one by-product are discharged to at least one of a recycled solids tank, a grinding mill, a syngas scrubber, and a vent treatment unit.

10. A syngas generation system in accordance with claim 9 wherein said treatment unit comprises:
    an ozone generator configured to produce the ozonated air from air; and
    an ozone contactor configured to react the raw sour water and the ozonated air to substantially remove the contaminates from the raw sour water.

11. A syngas generation system in accordance with claim 9 wherein said treatment unit comprises:
    an ultraviolet (UV) light generator configured to generate UV light; and
    a UV contactor comprising:
       at least UV light tube optically coupled to said UV light generator such that the UV light is transmitted through said at least one UV light tube; and
       at least one sour water tube coupled proximate to said at least one UV light tube such that the raw sour water and the UV light react to substantially remove the contaminates from the raw sour water.

12. A syngas generation system in accordance with claim 9 wherein said treatment unit comprises
    a hydrogen peroxide contactor configured to react the raw sour water with hydrogen peroxide to substantially remove the contaminates from the raw sour water; and
    a metering pump configured to meter a predetermined amount of the hydrogen peroxide into said hydrogen peroxide contactor.

* * * * *